(12) United States Patent
Kormann et al.

(10) Patent No.: US 8,554,424 B2
(45) Date of Patent: Oct. 8, 2013

(54) FORAGE HARVESTER WITH A CHOPPING MECHANISM AND A REWORKING DEVICE LOCATED DOWNSTREAM FROM THE CHOPPING MECHANISM

(75) Inventors: Georg Kormann, Zweibrücken (DE); Karl Josef Willeke, Dellfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/024,398

(22) Filed: Feb. 10, 2011

(65) Prior Publication Data

US 2012/0185140 A1 Jul. 19, 2012

(30) Foreign Application Priority Data

Feb. 25, 2010 (DE) .......................... 10 2010 002 343

(51) Int. Cl.
*G06F 7/70* (2006.01)
*A01D 69/06* (2006.01)
*A01D 69/10* (2006.01)
*A01D 75/18* (2006.01)
*A01D 75/28* (2006.01)

(52) U.S. Cl.
USPC .................. 701/50; 56/11.1; 56/11.2; 460/1; 460/7

(58) Field of Classification Search
USPC ...................... 460/1, 7; 701/50; 56/11.1, 11.2
See application file for complete search history.

(56) References Cited

U.S. PATENT DOCUMENTS

| | | | | |
|---|---|---|---|---|
| 3,812,661 A | * | 5/1974 | Baker | 56/14.4 |
| 3,832,836 A | * | 9/1974 | Anderson | 56/104 |
| 3,851,450 A | * | 12/1974 | Nelson | 56/14.4 |
| 3,982,385 A | * | 9/1976 | Hyman | 56/106 |
| 4,192,468 A | * | 3/1980 | Lawrence et al. | 241/101.762 |
| 4,345,417 A | * | 8/1982 | deBuhr et al. | 56/14.3 |
| 4,450,671 A | * | 5/1984 | Love | 56/14.6 |
| 4,478,030 A | * | 10/1984 | Druais et al. | 56/60 |
| 4,805,385 A | * | 2/1989 | Bohman et al. | 56/10.2 J |
| 4,951,031 A | * | 8/1990 | Strubbe | 340/684 |
| 5,092,819 A | * | 3/1992 | Schroeder et al. | 460/7 |
| 5,327,708 A | * | 7/1994 | Gerrish | 56/1 |
| 5,498,207 A | * | 3/1996 | Cappon et al. | 460/119 |
| 5,751,421 A | * | 5/1998 | Wright et al. | 356/328 |
| 5,822,962 A | * | 10/1998 | Wagstaff et al. | 56/16.4 R |
| 5,976,012 A | * | 11/1999 | Naaktgeboren et al. | 460/113 |

(Continued)

FOREIGN PATENT DOCUMENTS

| | | |
|---|---|---|
| DE | 10030505 | 6/2000 |
| EP | 1380204 | 6/2003 |
| EP | 2098110 | 9/2009 |

OTHER PUBLICATIONS

European Search Report Dated: Jun. 21, 2011, 4 pgs.

*Primary Examiner* — Thomas Black
*Assistant Examiner* — Tyler Paige
(74) *Attorney, Agent, or Firm* — Quarles & Brady LLP

(57) ABSTRACT

A forage harvester is provided with a chopping arrangement and a reworking device downstream from the chopping arrangement. The reworking device having two rolls between which the harvested crop chopped by the chopping mechanism can be passed through and whose spacing and/or compressive force is adjustable by a unit that is actuated by an external force and is connected with a control device. The control device is acted upon by information with regard to the cut length of the chopping arrangement and directs the unit as a function of the cut length.

7 Claims, 2 Drawing Sheets

(56) References Cited

U.S. PATENT DOCUMENTS

| | | | |
|---|---|---|---|
| 6,052,975 A * | 4/2000 | Kraus et al. | 56/16.4 B |
| 6,131,837 A * | 10/2000 | Wanner et al. | 241/101.742 |
| 6,192,664 B1 * | 2/2001 | Missotten et al. | 56/10.2 R |
| 6,401,549 B1 * | 6/2002 | Ohlemeyer | 73/861.73 |
| 6,421,990 B1 * | 7/2002 | Ohlemeyer et al. | 56/10.2 R |
| 6,431,981 B1 * | 8/2002 | Shinners et al. | 460/6 |
| 6,584,755 B2 * | 7/2003 | Holtkotte | 56/10.2 B |
| 6,616,527 B2 * | 9/2003 | Shinners et al. | 460/6 |
| 6,726,559 B2 * | 4/2004 | Bischoff | 460/1 |
| 6,874,304 B2 * | 4/2005 | Clauss | 56/10.2 R |
| 6,988,352 B2 * | 1/2006 | Van Vooren | 56/16.4 R |
| 7,077,743 B2 * | 7/2006 | Quincke et al. | 460/7 |
| 7,169,040 B2 * | 1/2007 | Kormann et al. | 460/7 |
| 7,618,311 B2 * | 11/2009 | Diekhans | 460/7 |
| 7,650,734 B2 * | 1/2010 | Beck et al. | 56/10.2 R |
| 7,681,383 B2 * | 3/2010 | Argetsinger et al. | 56/14.6 |
| 8,019,517 B2 * | 9/2011 | Boenig et al. | 701/50 |
| 8,056,309 B2 * | 11/2011 | Vandendriessche | 56/16.4 B |
| 8,133,100 B2 * | 3/2012 | Regier et al. | 460/109 |
| 8,133,101 B2 * | 3/2012 | Regier et al. | 460/109 |
| 2003/0188521 A1 * | 10/2003 | Muller et al. | 56/16.4 R |
| 2005/0137003 A1 * | 6/2005 | Behnke et al. | 460/1 |

* cited by examiner

FORAGE HARVESTER WITH A CHOPPING MECHANISM AND A REWORKING DEVICE LOCATED DOWNSTREAM FROM THE CHOPPING MECHANISM

FIELD OF THE INVENTION

The invention concerns a forage harvester having a chopping mechanism and a reworking device located downstream from the chopping mechanism. The reworking device having two rolls between which the harvested crop chopped by the chopping mechanism can be passed through. The spacing and/or compressive force of the two rolls being adjustable by a unit connected with a control mechanism and actuated by an external force.

BACKGROUND OF THE INVENTION

In the state of the art, the rolls of reworking mechanisms that are located downstream from a chopping drum in a forage harvester can be positioned mechanically in a definite spacing (EP 2 098 110 A2). The problem of an optimal adjustment of the spacing between the rolls of the reworking mechanism arises here. If the spacing is small, a secure striking of the grains contained in the harvested crop is indeed assured, but (in relation to rolls arranged at a greater distance) the feed rate is reduced and the energy requirement for driving the reworking mechanism is increased. These shortcomings are avoided by increasing the distance, but in the case of a wet crop the grains are not struck sufficiently securely due to their greater elasticity as compared with a dry crop. Then the animals fed with the crop material cannot digest it completely.

DE 100 30 505 A1, which is considered type-forming, describes a reworking arrangement having two rolls, the spacing or compressive force of which is automatically adjusted as a function of a parameter of the harvested crop, in particular, the moisture content.

In chopping the crop a certain proportion of the grains in the crop is struck by the knives of the chopping drum. This proportion, which is larger the shorter the chopping length, is not taken into account in the automatic adjustment of the distance between the rolls of the reworking mechanism according to DE 100 30 505 A1.

The problem underlying the invention is thus considered to be achieving a reliable striking of the grains contained in the crop along with as low as possible input power requirement of the reworking mechanism.

SUMMARY OF THE INVENTION

A forage harvester is equipped in a familiar manner with a chopping mechanism and a reworking mechanism located downstream from the chopping mechanisms. The reworking mechanism is comprised of two rolls, between which the chopped crop is passed during harvesting to strike the grains contained in the crop and improve the digestibility of the fodder by livestock. Information with regard to pertinent (real or theoretical) chopping length is fed into the control mechanism. The control mechanism manages an external force-actuated unit that adjusts the spacing between the rolls of the reworking mechanism and/or the compressive force with which one roll is pressed on the other roll. The chopping length of the crop is taken into account by the control mechanism.

It is thus achieved that the action of the chopping mechanism striking or cutting the grains, which is dependent on the cutting length of the crop material, is taken into account in adjusting the spacing of the rolls of the reworking arrangement and/or the compressive force of the rolls. In particular, the spacing drops with increasing chopping length and the power increases with increasing chopping length. Accordingly, the drive power requirement of the reworking arrangement is reduced with small chopping lengths and a reliable striking of the grains is assured at large chopping lengths.

In addition, the control mechanism can control the unit as a function of a measured parameter of the crop material. Particularly, this parameter can involve the moisture content of the material. Independently of the characteristics of the crop material, thus, a reliable striking of the grains contained in the crop is achieved and an optimal utilization of the nutritive value of the material is obtained in feeding the animals.

Instead of (or in addition to) the moisture content, the good content of the grains can, e.g., be measured, which can be established by the nutritive content, which is detectable by an appropriate sensor (see DE 199 22 867 A1). The grain proportion can also be measured optically. If the crop material is relatively moist, the grains in it are more elastic than in dry material. For this reason, they are more difficult to strike by the reworking arrangement. Thus, the spacing between the rolls is preferably adjusted larger with dry material than with wet material. Analogously, the compressive force is selected greater for wet material than for dry material.

In a preferred implementation of the invention, the control mechanism is connected with an operator input unit that serves to set a desired processing degree of the crop material by the reworking arrangement. The operator can thus make an adjustment if he/she desires as fine a possible processing of the crop material or the lowest possible drive power requirement of the subsequent pulverization arrangement. Several or as many as desired intermediate stages are possible. The control mechanism considers the operator's input and adjusts the unit accordingly. In as fine a processing of the crop material as possible, thus, the spacing between the rolls is reduced or the compressive force increased. Analogously, the spacing is increased and/or the compressive force of the rolls is reduced in the case of a desired minimum drive power requirement.

The information fed to the control mechanism on the actual cutting length can be based on a nominal value that is fed to a suitable device for adjusting the cutting length, e.g., a hydraulic motor for driving a feed mechanism that supplies the uncut crop material to the chopping drum, or an adjustable drive unit for operating a feed mechanism. There is however also the possibility of detecting the actual cutting length by a sensor unit, e.g., by means of a camera and an image processing system (see EP 1 671 530 A1 and EP 2 098 109 A1) and feed information on the actual cutting length to the control mechanism.

An implementation of the invention in which the control mechanism is informed by a sensor arrangement on the proportion of impacted (and/or the impacted) grains in the crop material, which can also operate with a camera and an image processing system is also provided. Reference is made here to the republished European Patent Application 09156078.9, whose disclosure is incorporated herein by reference. The control mechanism can correspondingly direct the detected proportion of impacted grains to make sure that a feedable proportion (fixedly prescribed or specified by the operator) of impacted grains is reached.

BRIEF DESCRIPTION OF THE DRAWINGS

The embodiments of the invention are described in detail below with reference to the accompanying drawings wherein.

DESCRIPTION OF THE PREFERRED EMBODIMENT

Figure 1:
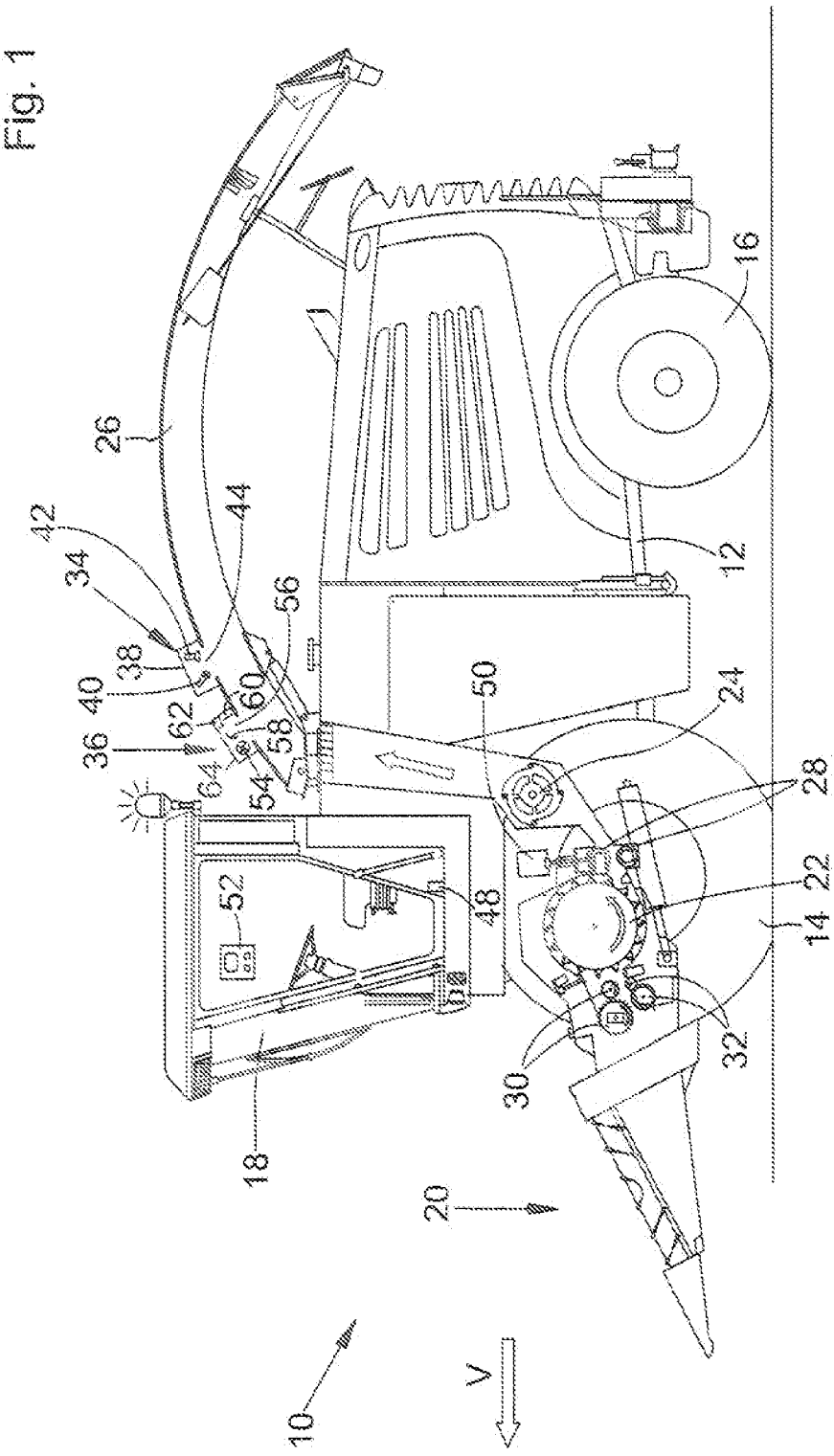
FIG. 1 is a self-propelled forage harvester in side view and in partial schematic representation; and, FIG. 2 is a reworking mechanism having a control device for regulating the spacing of the rolls.

FIG. 1 shows a self-propelled forage harvester 10 in schematic side view. The forage harvester 10 is built on a frame 12 that is carried by driven front wheels 14 and steerable rear wheels 16. The forage harvester 10 is operated from a driver cabin 18, from which a front harvesting attachment 20 in the form of a frontal mower for harvesting the corn can be seen. The harvested material picked up from the ground by the front attachment 20, e.g., grass or the like, is fed over an entrance conveyor having upper pressing rolls 30 and lower pressing rolls 32 that are located inside of an intake housing at the front side of the forage harvester 10, to a chopping device 22 in the form of a chopping drum underneath the drive cabin 18, which chops it into small pieces and feeds it to a conveyor device 24. The material leaves the working machine 10 to a transport vehicle running alongside via a discharge shaft and a discharge chute 26 that is rotatable around a somewhat vertical axis and is adjustable in inclination. The directional data, as lateral, down and up, refer in the following to the forward movement direction V of the forage harvester 10, which runs toward the left in FIG. 1.

A reworking arrangement with two collaborating rolls 28 is located between the chopping drum 22 and the conveyor device 24, through which the conveyed material of the conveyor device 24 is passed tangentially. The rolls 28 of the reworking arrangement are driven rotationally in the opposite direction. The stream of chopped material is passed between them. The purpose of the rolls 28 is to impact the grains (especially corn grains) of the harvested material so that they can be digested by the animals fed with the chopped material. The surfaces of the rolls of the reworking arrangement designated as the grain processor can be roughened, smooth or profiled in a familiar manner.

Figure 2:
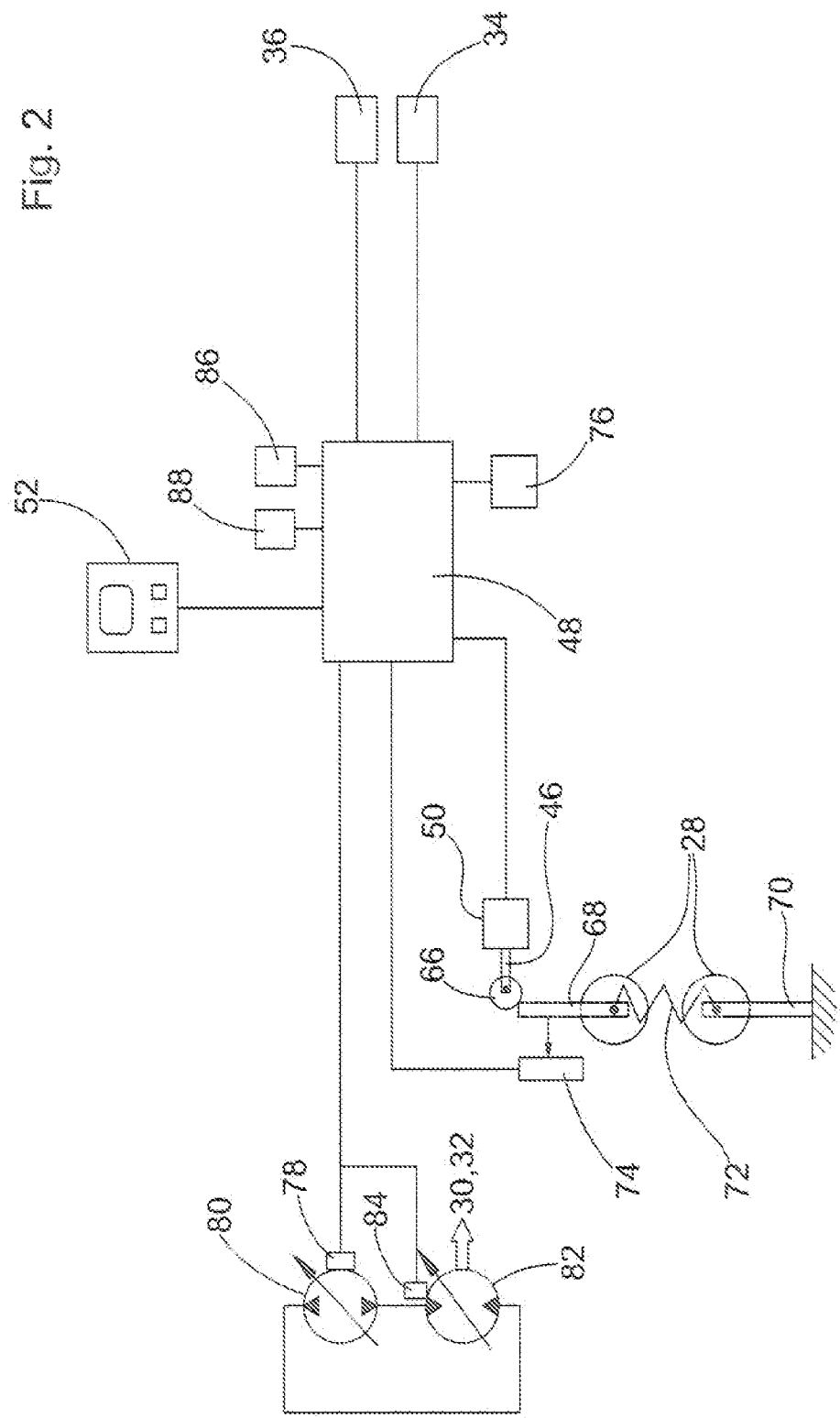

The spacing of the rolls 28 of the reworking arrangement is controlled by a control device 48, as elucidated in the following on the basis of FIG. 2. For this, the control device 48 is connected with a unit 50 in the form of an electric motor whose output shaft 46 drives an eccentric 66, which in turn adjusts a holder 68 in the vertical direction. Other than shown in FIG. 2, the output shaft 46 of unit 50 and the rotating axis of the eccentric 66 can be oriented orthogonally to the plane of the drawing. The upper roll 28 of the reworking mechanism is fastened on the holder 68. The lower roll 28 of the reworking device is located on a holder 70 rigidly connected with the frame 12. The holders 68 and 70 are drawn together by a spring 72, against the force of which the harvested material can move the rolls 28 apart. The eccentric 68 defines the maximum spacing between the rolls 28, which is variable by the unit 50. A sensor 74 in the form of a potentiometer feeds information to the control device 48 on the actual spacing of the rolls 28. Examples for a possible mechanical construction of the regulating device of the rolls 28 are given by EP 2 098 110 A2 and DE 100 30 505 A1. FIG. 2 merely depicts a scheme in principle.

The control device 48 is connected with a reservoir 76 and with an operator input device 52 that is located in the cabin 18. The control device 48 is also connected with a unit 78 that controls the swash plate of a hydraulic pump 80. The hydraulic pump 80 drives a hydraulic motor 82, which in turn drives the pressing rolls 30 and 32 via a transmission (not shown).

The absorption volume of the hydraulic motor 82 can be adjusted by a unit 84 controlled by the control device 48. However, it would also be conceivable to use a hydraulic motor 82 with a non-adjustable absorption volume; the unit 84 then drops out. An RPM sensor 86 feeds the data with regard to the RPM of the chopping device 22 to the control device 48. Another optional RPM sensor 88 can feed data with regard to the RPM of the pressing rolls 30 and/or 32 to the control device 48.

A first sensor arrangement 34 is placed on the upper side of the discharge chute. It has a strobe 40 and a camera 42 that collaborate through a window 44 with a disk plate with the harvested material conveyed and chopped in the discharge chute 26 and processed by the rolls 28 of the reworking arrangement. The strobe 40 illuminates the harvested material at time intervals and the camera 42 takes pictures of the harvested material. An image processing system integrated in the housing 38 of the first sensor device 34 derives the actual cut length from the pictures of the camera 42 and feeds the corresponding data to the control device 48. In addition, the image processing system can detect the proportion of impacted (or not impacted) grains in the harvested material and transmit them to the control device 48, which can show the proportions to the operator on the projection screen of the operator input device 52. Reference is made for this to the disclosures of the EP 1 671 530 A1, EP 2 098 109 A1 and the European Patent Application 09156078.9.

A second sensor device 36 is located on the upper side of the discharge chute. It is positioned upstream from the first sensor device 34, but can also be placed downstream from it or alongside it. The second sensor device 36 is preferably a spectrometer operating in the near infrared region (NIR), which collaborates through a window 56 with a disk plate with the harvested material conveyed in the discharge chute 26, chopped and processed by the rolls 28 of the reworking device. The second sensor device 36 is comprised of a housing 64, a light source 54, which illuminates the harvested material, a mirror 58 with a diffraction screen that deflects the light reflected by the harvested material in different directions as a function of the wavelengths, a photodetector 60 with several sensitive elements and an evaluation device 62. The evaluation device 62 receives data from the photodetector 60 with regard to the intensities assigned to the individual wavelengths of the light reflected by the harvested material and derives data from it with regard to the characteristics of the harvested material, especially with regard to the ingredients such as water, proteins and the like. Reference is made here to the disclosure of DE 199 22 867 A1. The evaluation device 62 feeds data with regard to the moisture content of the harvested material to the control device 48.

The following harvest operation mode of the control device 48 and the components associated with it subsequently results. The operator can feed in a desired cut length of the harvested material via the operator input device 52. Alternatively, an operating mode can be selected by means of the operator input device 52, in which the cut length is adjusted automatically as a function of the moisture content of the harvested material measured by the second sensor device 36, where manual corrections are possible by means of the operator input device 52 usually in this operating type also. The control device 48 then manages the RPM of the hydraulic motor 82 by means of units 78 and possibly 84. As a feedback value for the actual cut length the measured values of the RPM sensors 86 and 88 or the data of the first sensor device 34 are used, or it is derived from the initial RPM of the hydraulic pump 80 and the position of the units 78 and possibly 84 (see DE 102 42 885 A1).

The adjustment of the maximum gap between the rolls 28 of the reworking arrangement by means of units 50 is done on the basis of the chosen or measured cut length. It is thus taken into account that with shorter cut lengths a larger proportion of the grains is impacted or cut by the chopping device 22 so that the gap is adjusted smaller with larger chopping lengths than with smaller chopping lengths. In addition, the gap is adjusted as a function of the moisture content of the material supplied, detected with the second sensor device 36. Because the grains contained in the harvested material are impacted more severely the wetter the harvested material is, since the grains are then more elastic, a greater spacing between the rolls 28 is adjusted by the control device 48 with dry harvested material than in moist material. In this manner, one avoids the increased energy requirement associated with a relatively small gap in the case of dry harvested material and/or small cut lengths for the operation of the reworking arrangement, which is greater than with a large gap, or a manual adjustment of the distance between the rolls 28. The operator input device 52 also makes it possible to select the degree of processing of the harvested material with the reworking mechanism, e.g., by means of a menu control or a rotary knob. The operator can thus determine whether the harvested material is worked as fine as possible or whether a less thorough but economical processing of the harvested material for the drive power for the rolls 28 should occur.

The control device 48 then withdraws the nominal value for the spacing of the rolls 28 from a table set down in the reservoir 76, which is a function of the cut length, the moisture content and the processing degree selected. Alternatively, curves or equations can be used for determining the nominal value for the spacing of the rolls 28. The control device 48 then directs the unit 50 to bring the spacing of the rolls 28 to the nominal value, whereby the signals of the sensor 74 serve as feedback values.

It should be noted that various modifications of the invention are conceivable. Thus, it would be possible to use any other moisture sensor instead of the near infrared spectrometer of the second sensor device 36, e.g., a capacitive sensor, a microwave sensor or a conductivity sensor. The second sensor device 36 can also be placed at a site of the harvester 10 between the chopping arrangement 22 and the rotating track of the discharge chute 26 or upstream from the chopping arrangement 22.

Having described the preferred embodiment, it will become apparent that various modifications can be made without departing from the scope of the invention as defined in the accompanying claims.

The invention claimed is:

1. A forage harvester having a chopping arrangement and a reworking device located downstream from the chopping arrangement, the chopping arrangement comprising a chopping drum and a conveyor, the reworking device having at least two rolls between which the harvested material chopped by the chopping arrangement can be passed, the rolls of the reworking device being one of roughened and profiled to impact the grains of the harvested material and whose at least one of spacing and compressive force is adjustable by a unit actuated by an external force and connected with a control device, wherein the control device is acted upon with information regarding the cut length of the chopping arrangement and the control device is configured to direct the unit to adjust the at least one of the spacing and the compressive force of the reworking device rolls as a function of the cut length.

2. A forage harvester according to claim 1, wherein the control device is used to reduce the spacing between the rolls with one of increasing cut length and increasing the compressive force with increasing cut length.

3. A forage harvester according to claim 1, wherein the control device is acted upon with information with regard to a detected actual cut length of the harvested material and the control device is configured to direct the unit to adjust the at least one of the spacing and the compressive force of the reworking device rolls as a function of the detected actual cut length.

4. A forage harvester according to claim 1, wherein the control device is acted upon with information with regard to the moisture content of the harvested material and the control device is configured to direct the unit to adjust the at least one of the spacing and the compressive force of the reworking device rolls as a function of the moisture content.

5. A forage harvester according to claim 1, wherein the control device is connected with an operator input device, with which an operator inputs a desired degree of processing of the harvested material and the control unit directs the unit also as a function of the desired degree of processing introduced.

6. A forage harvester according to claim 5, wherein the degree of processing can be selected between one of as fine as possible processing of the harvested material and a position of the lowest drive power requirement of the reworking arrangement.

7. A forage harvester according to claim 1, wherein the control device is connected with a sensor arrangement for detecting at least one of the actual cut length and the proportion of one of impacted and non-impacted grains in the harvested material.

* * * * *